United States Patent
Patterson et al.

(10) Patent No.: US 12,405,070 B2
(45) Date of Patent: Sep. 2, 2025

(54) CORROSION RESISTANT MICROCHANNEL HEAT EXCHANGER

(71) Applicant: Carrier Corporation, Palm Beach Gardens, FL (US)

(72) Inventors: Matthew Patterson, East Syracuse, NY (US); Hani Nassar, Baldwinsville, NY (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 210 days.

(21) Appl. No.: 18/087,043

(22) Filed: Dec. 22, 2022

(65) Prior Publication Data

US 2023/0213289 A1 Jul. 6, 2023

Related U.S. Application Data (60) Provisional application No. 63/296,332, filed on Jan. 4, 2022.

(51) Int. Cl.
*F28F 1/12* (2006.01)

(52) U.S. Cl.
CPC .......... *F28F 1/126* (2013.01); *F28F 2245/00* (2013.01); *F28F 2275/04* (2013.01)

(58) Field of Classification Search
CPC .... F28F 1/126; F28F 2275/04; F28F 2245/00; F28F 1/128
See application file for complete search history.

(56) References Cited

U.S. PATENT DOCUMENTS

| | | | | |
|---|---|---|---|---|
| 2001/0022221 | A1* | 9/2001 | Yamauchi | F28F 19/02 165/177 |
| 2002/0179297 | A1* | 12/2002 | Kato | B23K 1/0012 165/171 |
| 2004/0108365 | A1* | 6/2004 | Tapper | B23K 1/0012 228/183 |
| 2004/0177949 | A1* | 9/2004 | Shimoya | F28F 1/32 165/177 |
| 2006/0234082 | A1* | 10/2006 | Minami | F28F 21/084 428/650 |
| 2009/0053549 | A1* | 2/2009 | Inukai | C22C 21/00 428/595 |
| 2012/0024511 | A1* | 2/2012 | Harada | F28D 1/05366 165/181 |
| 2012/0318488 | A1* | 12/2012 | Hyogo | B23K 35/365 165/182 |

(Continued)

FOREIGN PATENT DOCUMENTS

JP H09203597 A * 5/1970
JP H10185473 A * 7/1998

(Continued)

*Primary Examiner* — Nelson J Nieves
(74) *Attorney, Agent, or Firm* — CANTOR COLBURN LLP (57) ABSTRACT

A heat exchanger includes a first manifold, aa second manifold, at least one heat exchange tube segment extending between and fluidly coupling the first manifold and the second manifold, and a fin having a non-linear configuration. A portion of the fin is affixed to an adjacent surface of the at least one heat exchange tube segment via a braze joint. The braze joint has a length, measured parallel to a length of the at least one heat exchange tube segment, less than or equal to 650 micrometers.

19 Claims, 7 Drawing Sheets

(56) References Cited

U.S. PATENT DOCUMENTS

| | | | |
|---|---|---|---|
| 2013/0075071 A1* | 3/2013 | Yabe | F28F 1/24 |
| | | | 165/183 |
| 2014/0360017 A1* | 12/2014 | Ikawa | B23K 1/0012 |
| | | | 427/192 |
| 2017/0284748 A1* | 10/2017 | Bungo | F28D 1/05383 |
| 2018/0169801 A1* | 6/2018 | Ueda | F28F 21/084 |
| 2018/0200779 A1* | 7/2018 | Prokop | B21D 53/022 |
| 2019/0086160 A1* | 3/2019 | Lu | F28F 1/126 |
| 2019/0242658 A1* | 8/2019 | Schiehlen | F28F 1/325 |
| 2019/0382873 A1* | 12/2019 | Ito | F28F 1/022 |
| 2020/0047290 A1* | 2/2020 | Katsumata | B23K 35/3605 |
| 2020/0256627 A1* | 8/2020 | Armsden | F28F 9/0263 |
| 2022/0063024 A1* | 3/2022 | Mori | C22F 1/047 |
| 2022/0072665 A1* | 3/2022 | Mori | F28F 21/084 |
| 2023/0095279 A1* | 3/2023 | Hara | F28F 1/126 |
| | | | 62/428 |
| 2024/0271837 A1* | 8/2024 | Kishida | F28D 1/0417 |

FOREIGN PATENT DOCUMENTS

| | | | | |
|---|---|---|---|---|
| JP | 11311488 A | * | 11/1999 | F28D 1/05383 |
| JP | 2005061648 A | * | 3/2005 | F28D 1/05366 |
| JP | 2006225722 A | * | 8/2006 | B21C 37/22 |

* cited by examiner

CORROSION RESISTANT MICROCHANNEL HEAT EXCHANGER

CROSS-REFERENCE TO RELATED APPLICATIONS

This application claims the benefit of U.S. Provisional Application No. 63/296,332 filed Jan. 4, 2022, the disclosure of which is incorporated herein by reference in its entirety.

BACKGROUND

Embodiments of the present disclosure relate to the art of heat exchangers, and more particularly, to a braze joint for affixing a fin to an aluminum alloy tube in a microchannel heat exchanger.

Heat exchangers are widely used in various applications, including in heating and cooling systems. Many heat exchangers used to transfer heat from one fluid to another fluid utilize one or more tubes through which one fluid flows while a second fluid flows around an exterior of the tube(s). Heat from one of the fluids is transferred to the other fluid by conduction through the tube walls. Many configurations also utilize fins in thermally conductive contact with the outside of the tube(s) to provide increased surface area across which heat can be transferred between the fluids, thereby improving the heat transfer and enhancing the structural rigidity of the heat exchanger.

Heat exchanger tubes may be made from a variety of materials, including metals such as aluminum or copper and alloys thereof. Aluminum alloys are lightweight, have a high specific strength and high thermal conductivity. Due to these excellent mechanical and thermal properties, aluminum alloys are used to manufacture heat exchangers for heating or cooling systems in commercial, industrial, residential, transport, refrigeration, and marine applications. However, aluminum alloy heat exchangers can be susceptible to corrosion.

Of particular concern is the resistance of these microchannel heat exchangers to corrosive condensates produced in the operation of evaporators. The condensing humidity collects soluble volatile organic compounds (VOCs) and their degradation products and produces an acidic condensate. This is particular common in residential and commercial comfort cooling applications where aerosols, combustion products, cleaners, cooking fumes, construction materials and aromatherapies may pass over the evaporator and soluble components condensed. In these particular environments, Aluminum alloy heat exchangers may be particularly susceptible to corrosion at the joint between the fins and the tubes making this a common location for leaks and/or failures.

BRIEF DESCRIPTION

According to an embodiment, a heat exchanger includes a first manifold, aa second manifold, at least one heat exchange tube segment extending between and fluidly coupling the first manifold and the second manifold, and a fin having a non-linear configuration. A portion of the fin is affixed to an adjacent surface of the at least one heat exchange tube segment via a braze joint. The braze joint has a length, measured parallel to a length of the at least one heat exchange tube segment, less than or equal to 650 micrometers.

In addition to one or more of the features described herein, or as an alternative, further embodiments the length of the braze joint is less than or equal to 600 micrometers.

In addition to one or more of the features described herein, or as an alternative, further embodiments the length of the braze joint is less than or equal to 550 micrometers.

In addition to one or more of the features described herein, or as an alternative, further embodiments the length of the braze joint is less than or equal to 500 micrometers.

In addition to one or more of the features described herein, or as an alternative, further embodiments the length of the braze joint is at least 300 micrometers.

In addition to one or more of the features described herein, or as an alternative, further embodiments a width of the braze joint extends over an entire width of the fin.

In addition to one or more of the features described herein, or as an alternative, further embodiments a width of the braze joint extends over only part of a width of the fin.

In addition to one or more of the features described herein, or as an alternative, further embodiments the braze joint is formed by a brazing filler material connecting the fin and the adjacent surface of the at least one heat exchange tube segment and the fin is formed from only a core material, the core material being the source of the brazing filler material.

In addition to one or more of the features described herein, or as an alternative, further embodiments the fin has a serpentine configuration including at least one peak and at least one trough, wherein the portion of the fin affixed to the adjacent surface of the at least one heat exchange tube segment is the at least one trough.

In addition to one or more of the features described herein, or as an alternative, further embodiments the fin has a serpentine configuration including at least one peak and at least one trough, wherein the portion of the fin affixed to the adjacent surface of the at least one heat exchange tube segment is the at least one peak.

In addition to one or more of the features described herein, or as an alternative, further embodiments the at least one heat exchange tube segment is formed from a metal alloy and has a zinc coating.

In addition to one or more of the features described herein, or as an alternative, further embodiments the heat exchanger is an evaporator in an air conditioning system.

According to an embodiment, a method of attaching a fin to a heat exchange tube segment of a heat exchanger includes positioning a portion of the fin in contact with a surface of the heat exchange tube segment, locally melting the fin at the interface with the heat exchange tube segment, and forming a braze joint between the portion of the fin and the heat exchange tube segment via the melted portion of the fin. The braze joint has a length, measured parallel to a length of the heat exchange tube segment, less than 650 micrometers.

In addition to one or more of the features described herein, or as an alternative, further embodiments the length of the braze joint is less than or equal to 600 micrometers.

In addition to one or more of the features described herein, or as an alternative, further embodiments the length of the braze joint is less than or equal to 550 micrometers.

In addition to one or more of the features described herein, or as an alternative, further embodiments the length of the braze joint is less than or equal to 500 micrometers.

In addition to one or more of the features described herein, or as an alternative, further embodiments the length of the braze joint is at least 300 micrometers.

In addition to one or more of the features described herein, or as an alternative, further embodiments forming the braze joint further comprises controlling the melting of the portion of the fin in contact with the heat exchange tube segment According to an embodiment, a heat exchanger includes a first manifold, aa second manifold, at least one heat exchange tube segment extending between and fluidly coupling the first manifold and the second manifold, and a fin having a non-linear configuration. A portion of the fin is affixed to an adjacent surface of the at least one heat exchange tube segment via a braze joint. The fin is formed from a metal alloy including silicon particles.

In addition to one or more of the features described herein, or as an alternative, further embodiments the fin does not include a cladding layer.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
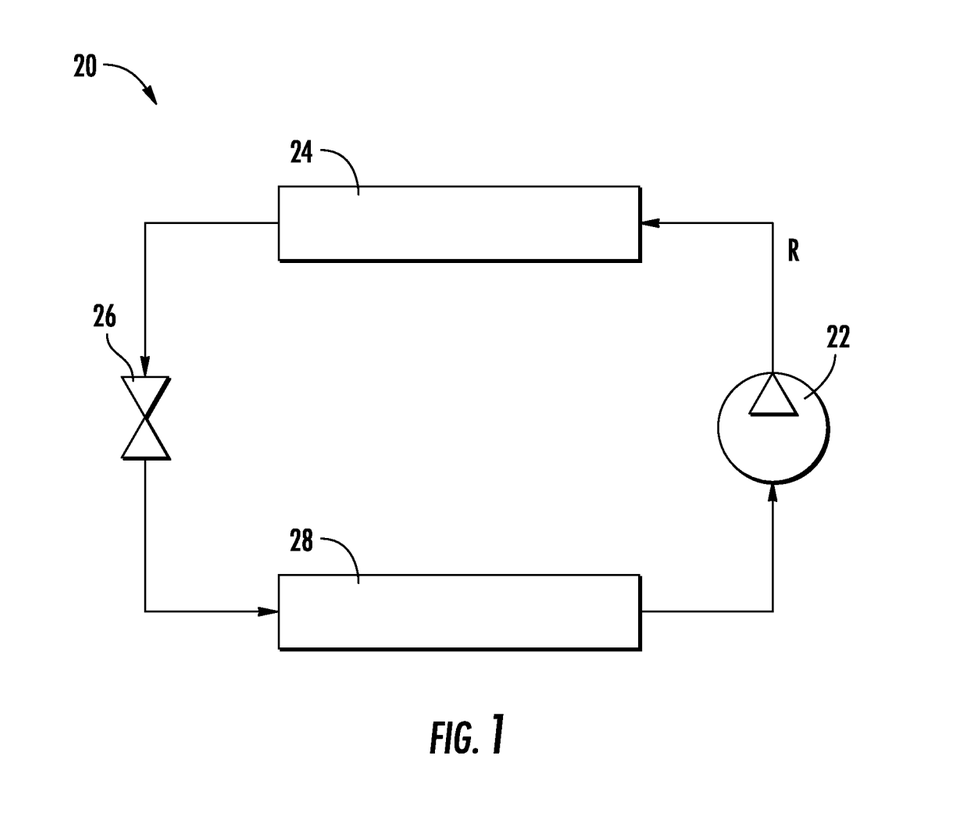
FIG. 1 is a schematic diagram of a basic vapor compression cycle of an air conditioning system according to an embodiment.

With reference now to FIG. 1, a schematic diagram of an example of a basic vapor compression cycle of an air conditioning system 20 is illustrated. The vapor compression cycle includes a compressor 22, a heat rejection heat exchanger (condenser) 24, an expansion device 26, and a heat absorption heat exchanger (evaporator). A fluid, such as a refrigerant for example, is configured to circulate through the vapor compression cycle, such as in a counter-clockwise direction for example.

In operation, the compressor 22 receives a refrigerant vapor from the second heat exchanger 28 and compresses it to a high temperature and pressure. The relatively hot refrigerant vapor is then delivered to the heat rejection heat exchanger 24 where it is cooled and condensed to a liquid state via heat exchange relationship with a cooling medium C, such as air or water. The cooled liquid refrigerant flows from the heat rejection heat exchanger 24 to the expansion device 26, such as an expansion valve, for example, in which the refrigerant is expanded to a low temperature two phase liquid/vapor state. From the expansion device 26, the refrigerant is provided to the heat absorption heat exchanger 28. Heat is transferred from a secondary medium, such as air for example, to the refrigerant within the heat absorption heat exchanger 28, causing the two phase refrigerant to vaporize. From the heat absorption heat exchanger 28, the low pressure vapor refrigerant returns to the compressor 22 so that the cycle may be repeated.

Figure 2A:
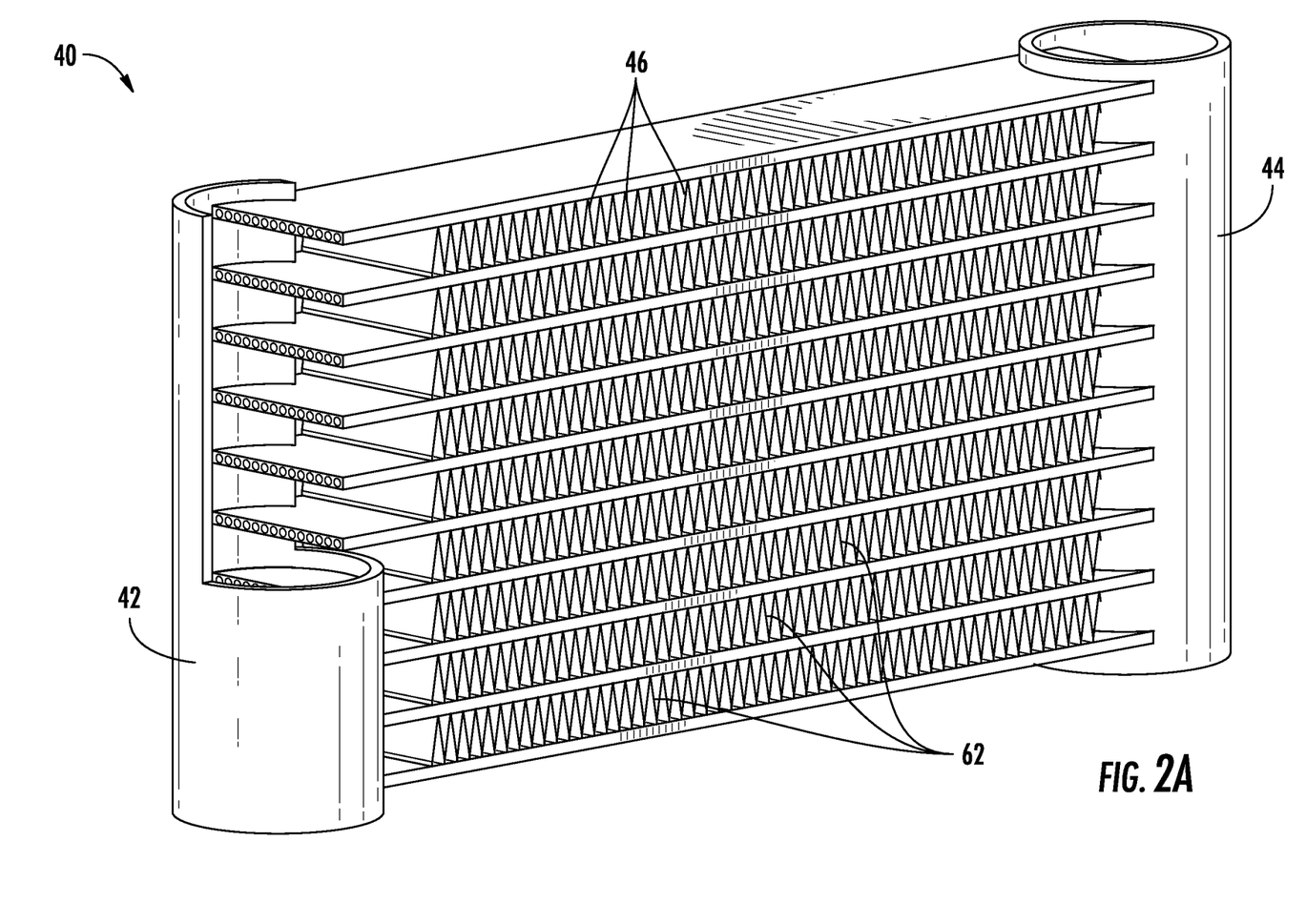
FIG. 2A is a perspective view of an exemplary heat exchanger of an air conditioning system according to an embodiment.

Referring now to FIG. 2A, a perspective view of an example of a heat exchanger 40, such as suitable for use in an air conditioning system 20, is illustrated. In an embodiment, the heat exchanger 40 is suitable for use as an evaporator within a vapor compression cycle. As shown, the heat exchanger 40 includes a first manifold or header 42, a second manifold or header 44 spaced apart from the first manifold 42, and a plurality of heat exchange tube segments 46 extending in a spaced parallel relationship between and fluidly connecting the first manifold 42 and the second manifold 44. In the illustrated, non-limiting embodiments, the first manifold 42 and the second manifold 44 are oriented generally vertically, and the at least one heat exchange tube segment 46 extends generally horizontally between the two manifolds 42, 44. The manifolds 42, 44 may comprise hollow, closed end cylinders having a circular cross-section. However, manifolds 42, 44 having other cross-sectional shapes, such as semi-elliptical, square, rectangular, hexagonal, octagonal, or other cross-sections for example, are within the scope of the disclosure.

Figure 2B:
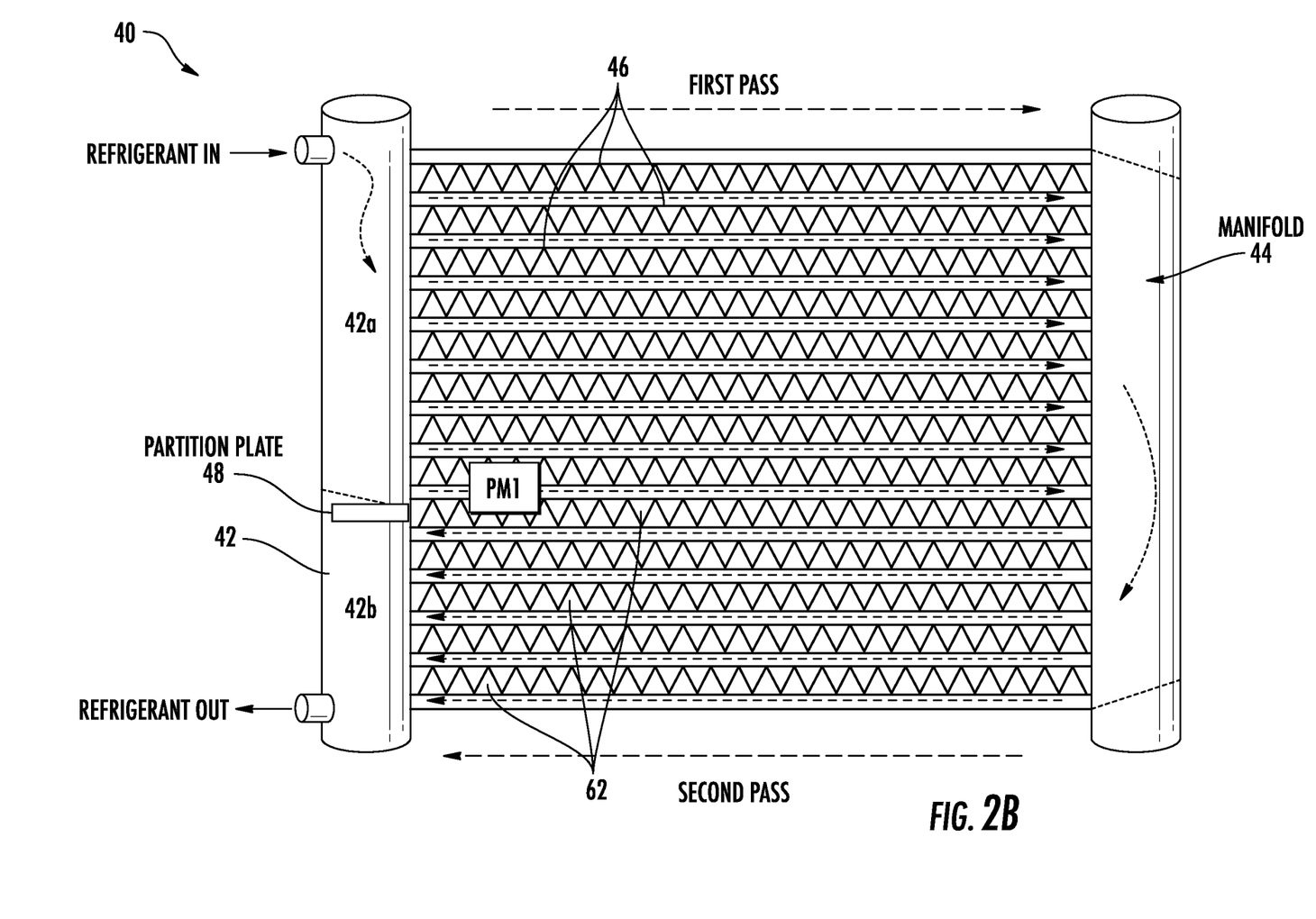
FIG. 2B is a perspective view of another exemplary heat exchanger of an air conditioning system according to an embodiment.

In an embodiment, best shown in FIG. 2B, the heat exchanger 40 has a multi-pass configuration relative to a secondary fluid A (e.g., air, air having dilute ethylene gas therein, nitrogen, and the like). To achieve a multi-pass configuration, one or more partition plates 48 are mounted within at least one of the first manifold 42 and the second manifold. In the illustrated, non-limiting embodiment, a partition plate is arranged within the first manifold 42, thereby separating the first manifold 42 into a first chamber 42a and a second chamber 42b. In operation, refrigerant R is configured to flow from the first manifold 42 to the second manifold 44 through the portion of the heat exchange tube segments 46 fluidly connected to the first chamber 42a in a first direction. From the second manifold 44, the flow of refrigerant will be directed in a second direction through the portion of heat exchange tube segments 46 arranged in fluid communication with the second chamber 42b of the first manifold 42. It should be understood that the configurations of the heat exchanger illustrated and described with respect to FIGS. 2A and 2B are intended as an example only, and that a heat exchanger 40 having any suitable configuration is within the scope of the disclosure.

Figure 3:
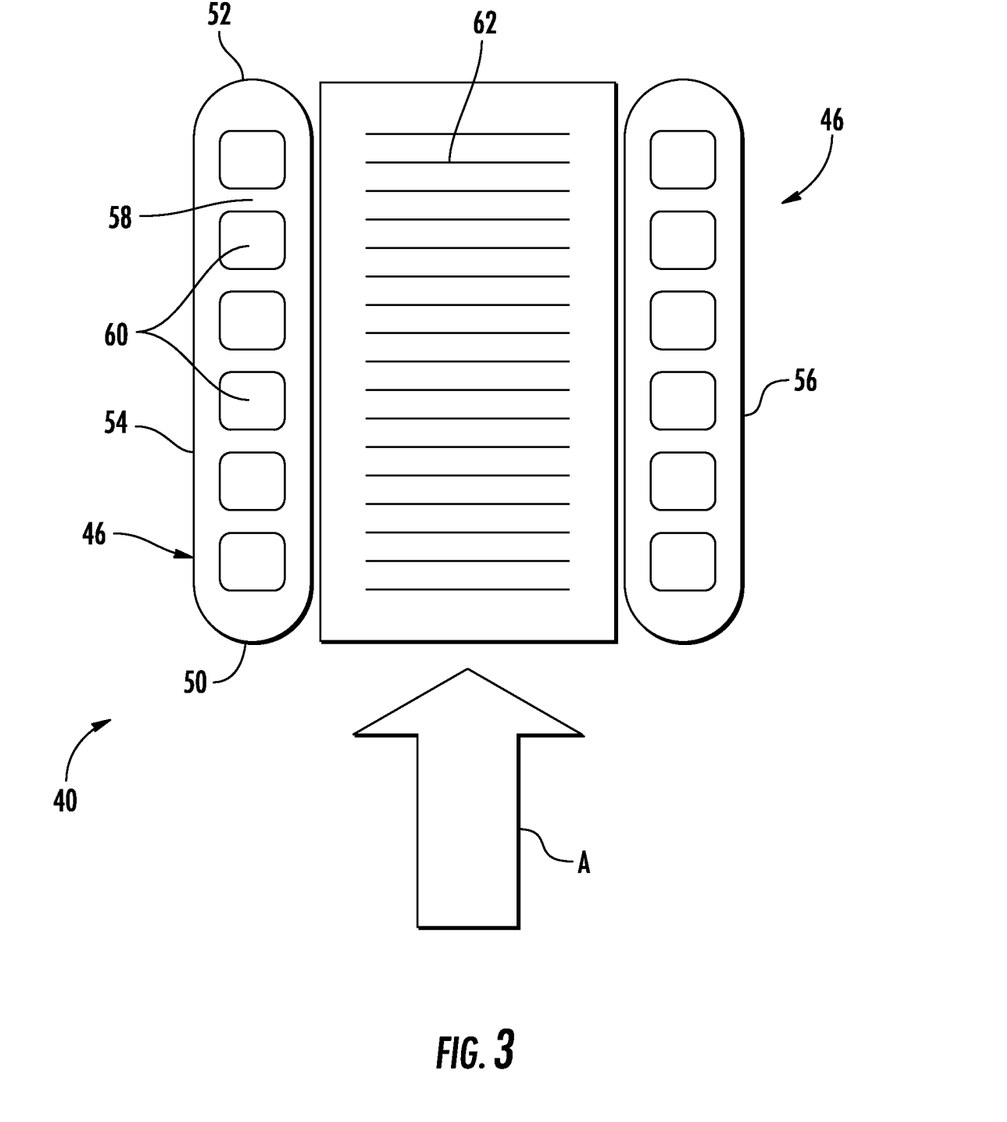
FIG. 3 is a cross-sectional view of an exemplary heat exchange tube segment of a heat exchanger according to an embodiment.

With reference now to FIG. 3, each heat exchange tube segment 46 comprises a leading edge 50, a trailing edge 52, a first upper surface 54, and a second lower surface 56. The leading edge 50 of each heat exchange tube segment 46 is upstream of its respective trailing edge 52 with respect to the flow of the heat transfer fluid A through the heat exchanger 40. The interior flow passage of each heat exchange tube segment 46 may be divided by interior walls 58 into a plurality of fluidly distinct flow channels 60 that extend longitudinally over the length of the heat exchange tube segment 46 and establish fluid communication between the respective first and second manifolds 42, 44. The discrete flow channels 60 may have a circular cross-section, a rectangular cross-section, a trapezoidal cross-section, a triangular cross-section, or another non-circular cross-section (e.g., elliptical, star shaped, closed polygon having straight or curved sides).

Figure 5:
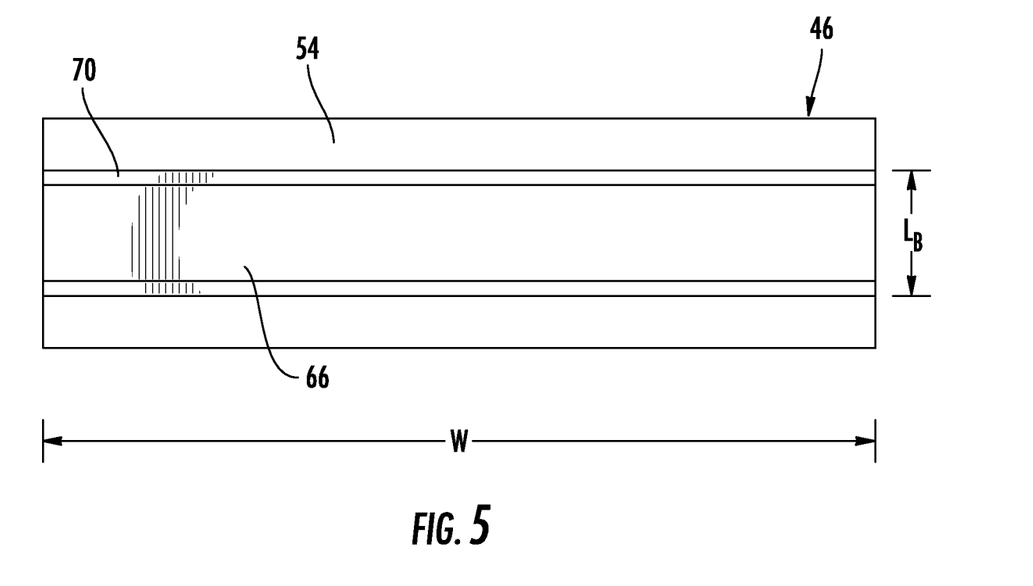
FIG. 5 is a plan view of a portion of an exemplary heat exchange tube segment and a trough of a fin connected to a surface of the heat exchange tube segment by a braze joint according to an embodiment.

The heat exchange tube segments 46 disclosed herein may further include a plurality of fins 62. In an embodiment, each fin 62 is formed of a single continuous strip of fin material tightly folded to have a non-linear configuration. As shown, the fin 62 is folded in a ribbon-like serpentine configuration thereby providing a plurality of closely spaced fins that extend generally orthogonal to the heat exchange tube segments 46. Typically, the fin density of the closely spaced fins of each continuous folded fin may be about 16 to 25 fins per inch, but higher or lower fin densities may also be used. Further, as best shown in FIG. 5, in an embodiment, a width of the fin 62 associated with each of the heat exchange tube segments 46 is equal to or substantially equal to a width of the heat exchange tube segment 46. However, embodiments where a width of the fin 62 is different, for example shorter than a width of the heat exchange tube segment 46 is also contemplated herein.

Heat exchange between the refrigerant flow, R, and air flow, A, occurs through the outside surfaces 54, 56, respectively, of the heat exchange tube segments 46, collectively forming a primary heat exchange surface, and also through the heat exchange surface of the fins 62, which forms the secondary heat exchange surface.

Figure 4:
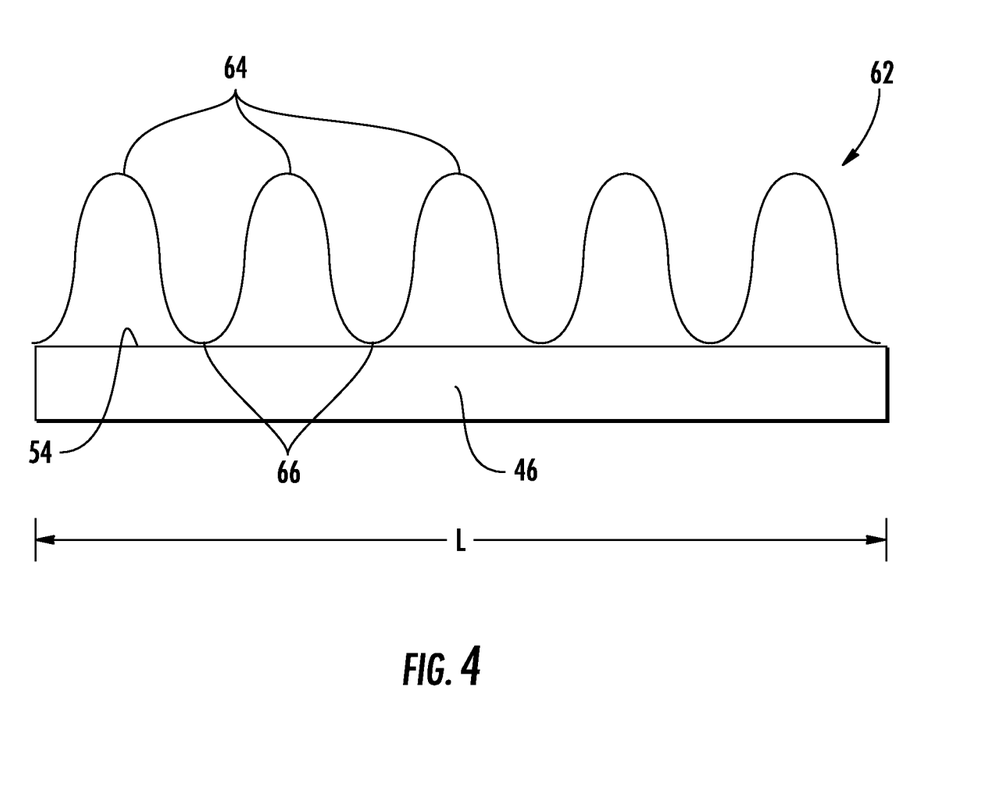
FIG. 4 is a side view of an exemplary heat exchange tube segment and fin of a heat exchanger according to an embodiment.

As suggested, the fins 62 may have a serpentine shape, best shown in FIG. 4, as generally including a plurality of peaks 64 and a plurality of troughs 66. Each of the plurality of troughs 66 may be affixed to an adjacent surface, such as an upper surface 54 of a heat exchanger tube segment 46. Alternatively, or in addition, each of the plurality of peaks 64 may also be affixed to a lower surface 56 of an adjacent heat exchanger tube segment 46. One or more braze joints 70 (shown in FIG. 5) are formed between at least one peak 64 or at least one trough 66 of a fin 62 and the adjacent heat exchanger tube segment 46. In an embodiment, the braze joint 70 formed at a peak 64 or trough 66 may span the entire width of the fin 62, as shown in FIG. 5. However, embodiments where a braze joint 70 spans only a portion of a width of the fin 62, and also embodiments where a plurality of braze joints 70 separated from one another by a distance are formed between a peak 64 or trough 66 and an adjacent heat exchange tube segment 46, are also contemplated herein.

In an embodiment, a length LB of the braze joint 70 measured parallel to the length of the heat exchange tube segment 46 is less than 650 micrometers, and in some embodiments is less than 600 micrometers, less than 575 micrometers, less than 550 micrometers, less than 525 micrometers, or less than 500 micrometers. Further, to ensure sufficient heat transfer between each peak or trough of the fin 62 and the heat exchange tube segment, the length LB of the braze joint 70 measured parallel to the length of the heat exchange tube segment 46 is at least 300 micrometers. In embodiments including a plurality of braze joints formed between a single peak 64 or trough 66 and an adjacent heat exchange tube segment 46, the configuration of each braze joint 70, such as the length thereof for example, may be substantially identical, or alternatively may vary.

Figure 6:
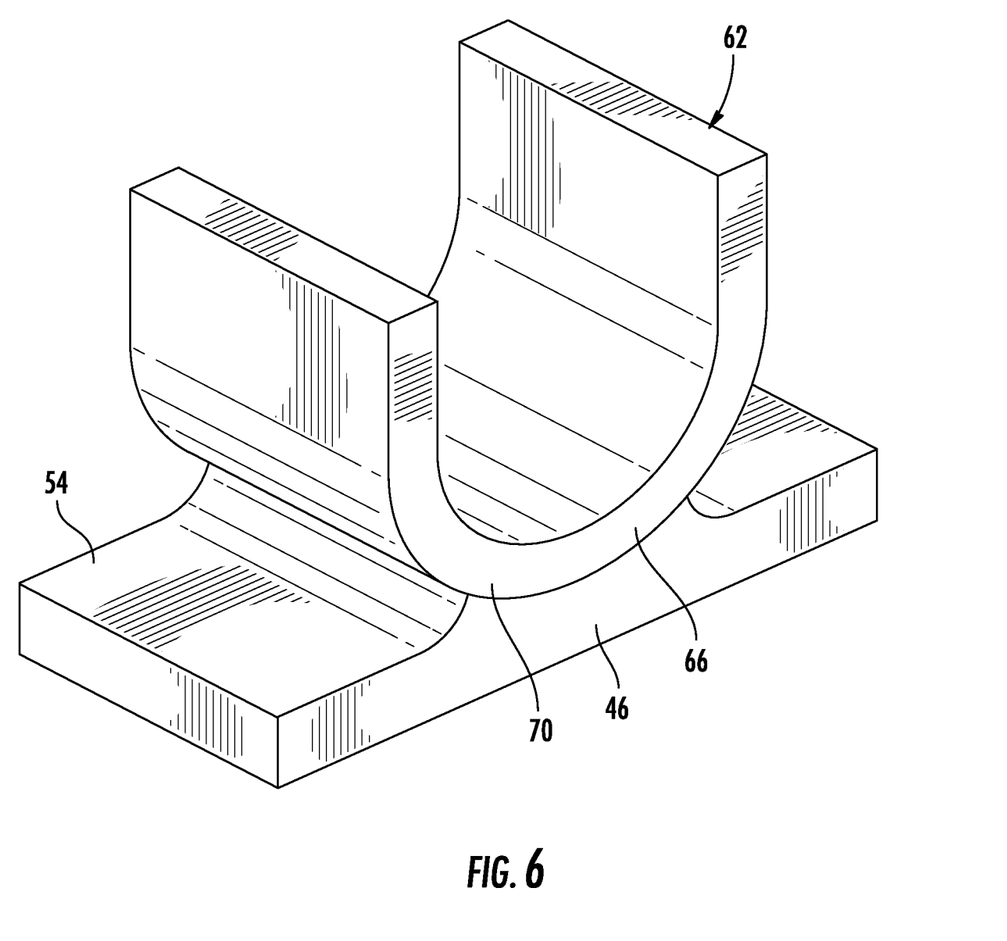
FIG. 6 is a perspective view of an exemplary braze joint formed between a trough of a fin and a surface of an adjacent heat exchange tube segment according to an embodiment.

With reference now to FIG. 6, in the illustrated, non-limiting embodiment, the fin 62 is formed of a metal alloy with embedded silicon particles and does not have a cladding layer on any of its surfaces. This is unlike existing heat exchanger fins which are typically formed of a non-silicon containing aluminum alloy core and have one or more layers of silicon-containing aluminum brazing filler material.

A method of attaching a fin to a heat exchange tube segment of a heat exchanger, includes positioning the fin 62 in contact with the surface of the heat exchange tube segment 46. More specifically, the peaks 64 or troughs 66 are arranged in direct contact with a corresponding surface 54, 56 of the heat exchange tube segment 46. Heat is then applied to the fin 62 and tube 46 assembly, thereby causing a small portion of the fin 62 adjacent to the tube 46 to melt. The resulting melted portion of the fin is used in place of the clad brazing filler material to form the braze joint. The partial melting of the fin may be controlled to form a desirable shape, such as a fillet for example, at the edges of the braze joint, as well as to achieve a length as described above.

Because the material used to form the braze joint contains less silicon than existing brazing filler material in cladded fins, the galvanic driving force for corrosion is reduced. In addition, without wanting to be bound by any specific theory, it is believed that by using the material of the core of the fin 62 as the brazing filler material, less of the zinc that coats the surface of the aluminum heat exchange tube segment is pulled into the braze joint. As a result, the zinc coating surrounding the braze joint remains intact and as a protective barrier for the material of the heat exchange tube segment providing corrosion resistance.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A heat exchanger comprising:
   a first manifold;
   a second manifold;
   at least one heat exchange tube segment extending between and fluidly coupling the first manifold and the second manifold; and
   a fin formed from a core material and having a non-linear configuration, wherein a portion of the fin is affixed to an adjacent surface of the at least one heat exchange tube segment via a braze joint, the braze joint being formed from a portion of the core material and having a length, measured parallel to a length of the at least one heat exchange tube segment, less than or equal to 650 micrometers.

2. The heat exchanger of claim 1, wherein the length of the braze joint is less than or equal to 600 micrometers.

3. The heat exchanger of claim 1, wherein the length of the braze joint is less than or equal to 550 micrometers.

4. The heat exchanger of claim 1, wherein the length of the braze joint is less than or equal to 500 micrometers.

5. The heat exchanger of claim 1, wherein the length of the braze joint is at least 300 micrometers.

6. The heat exchanger of claim 1, wherein a width of the braze joint extends over an entire width of the fin.

7. The heat exchanger of claim 1, wherein a width of the braze joint extends over only part of a width of the fin.

8. The heat exchanger of claim 1, wherein the fin has a serpentine configuration including at least one peak and at least one trough, wherein the portion of the fin affixed to the adjacent surface of the at least one heat exchange tube segment is the at least one trough.

9. The heat exchanger of claim 1, wherein the fin has a serpentine configuration including at least one peak and at least one trough, wherein the portion of the fin affixed to the adjacent surface of the at least one heat exchange tube segment is the at least one peak.

10. The heat exchanger of claim 1, wherein the at least one heat exchange tube segment is formed from a metal alloy and has a zinc coating.

11. The heat exchanger of claim 1, wherein the heat exchanger is an evaporator in an air conditioning system.

12. A method of attaching a fin to a heat exchange tube segment of a heat exchanger, the method comprising:

positioning a portion of the fin in contact with a surface of the heat exchange tube segment, the fin being formed from a core material;

locally melting part of the core material of the fin in contact with the tube; and forming a braze joint between the portion of the fin and the heat exchange tube segment via the melted part of the core material of the fin, wherein the braze joint has a length, measured parallel to a length of the heat exchange tube segment, less than 650 micrometers.

13. The method of claim 12, wherein the length of the braze joint is less than or equal to 600 micrometers.

14. The method of claim 12, wherein the length of the braze joint is less than or equal to 550 micrometers.

15. The method of claim 12, wherein the length of the braze joint is less than or equal to 500 micrometers.

16. The method of claim 12, wherein the length of the braze joint is at least 300 micrometers.

17. The method of claim 12, wherein forming the braze joint further comprises controlling the melting of the part of the fin in contact with the heat exchange tube segment.

18. A heat exchanger comprising:

a first manifold;

a second manifold;

at least one heat exchange tube segment extending between and fluidly coupling the first manifold and the second manifold; and a fin formed from a core material and having a non-linear configuration, wherein a portion of the fin is affixed to an adjacent surface of the at least one heat exchange tube segment via a braze joint, wherein the core material is a metal alloy including silicon particles and the braze joint is formed from a portion of the core material.

19. The heat exchanger of claim 18, wherein the fin does not have a cladding layer.

* * * * *